(12) United States Patent
Yuan

(10) Patent No.: US 12,145,644 B2
(45) Date of Patent: Nov. 19, 2024

(54) CARRIER FRAME

(71) Applicant: Wonderland Switzerland AG, Steinhausen (CH)

(72) Inventor: Jialiang Yuan, Guangdong (CN)

(73) Assignee: Wonderland Switzerland AG, Steinhausen (CH)

( * ) Notice: Subject to any disclaimer, the term of this patent is extended or adjusted under 35 U.S.C. 154(b) by 2 days.

(21) Appl. No.: 18/010,205

(22) PCT Filed: Jul. 2, 2021

(86) PCT No.: PCT/EP2021/068379
§ 371 (c)(1),
(2) Date: Dec. 13, 2022

(87) PCT Pub. No.: WO2022/003174
PCT Pub. Date: Jan. 6, 2022

(65) Prior Publication Data
US 2023/0249733 A1    Aug. 10, 2023

(30) Foreign Application Priority Data
Jul. 2, 2020  (CN) .......................... 202010628465.7

(51) Int. Cl.
*B62B 7/06* (2006.01)
*B62B 9/20* (2006.01)

(52) U.S. Cl.
CPC ................ *B62B 7/062* (2013.01); *B62B 9/20* (2013.01); *B62B 7/064* (2013.01); *B62B 2205/22* (2013.01); *B62B 2205/24* (2013.01)

(58) Field of Classification Search
CPC ........... B62B 7/062; B62B 9/20; B62B 7/064; B62B 2205/22; B62B 2205/24
See application file for complete search history.

(56) References Cited

U.S. PATENT DOCUMENTS 3,797,848 A * 3/1974 Burnham .................. B62B 7/08
  280/644
5,062,179 A * 11/1991 Huang ...................... B62B 9/20
  403/93
(Continued)

FOREIGN PATENT DOCUMENTS

CN    109436078 A    3/2019
CN    210063086 U    2/2020
(Continued)

OTHER PUBLICATIONS

"International Search Report" mailed on Jan. 3, 2022 for International application No. PCT/EP2021/068379, International filing date:Jul. 2, 2021.

*Primary Examiner* — Jacob B Meyer
(74) *Attorney, Agent, or Firm* — Winston Hsu

(57) ABSTRACT

The present invention discloses a carrier frame (100) including a first tubular member (1), a second tubular member (2), a third tubular member (3) and a folding unit (4) including a first rod (42), a linkage rod (43), a second rod (44) and a pivot frame (41) pivoted to the second tubular member (2). The first rod (42) is pivoted to the pivot frame (41) at a first pivot point and a second pivot point respectively. The linkage rod (43) is pivoted to the first tubular member (1) and pivoted to the pivot frame (41) at a third pivot point. The second rod (44) is pivoted to the third tubular member (3) and pivoted to the linkage rod (43) at a fourth pivot point. The second, third and fourth pivot points are located at the same pivot axis. The carrier frame (100) can be released and folded synchronously and has advantages that the carrier frame (100) is easy to fold, has a simple structure, and is convenient to operate.

28 Claims, 19 Drawing Sheets

(56) References Cited

U.S. PATENT DOCUMENTS

| | | | | |
|---|---|---|---|---|
| 7,632,035 | B2* | 12/2009 | Cheng | B62B 7/08 |
| | | | | 403/98 |
| 8,485,547 | B2* | 7/2013 | Hsu | B62B 7/062 |
| | | | | 280/658 |
| 9,908,551 | B2* | 3/2018 | Ransil | B62B 9/102 |
| 11,225,279 | B2* | 1/2022 | Horst | B62B 7/145 |
| 11,613,291 | B2* | 3/2023 | Yuan | B62B 7/062 |
| | | | | 280/650 |
| 11,772,697 | B2* | 10/2023 | Yi | B62B 7/08 |
| | | | | 280/642 |
| 11,938,992 | B2* | 3/2024 | Yuan | B62B 5/064 |
| 2012/0104729 | A1 | 5/2012 | Yi | |
| 2016/0046314 | A1* | 2/2016 | Zehfuss | B62B 9/104 |
| | | | | 297/354.12 |
| 2017/0313337 | A1* | 11/2017 | Horst | B62B 7/044 |
| 2023/0042740 | A1* | 2/2023 | Yuan | B62B 9/085 |
| 2023/0159078 | A1* | 5/2023 | Zhu | B62B 7/062 |
| 2023/0249733 | A1* | 8/2023 | Yuan | B62B 7/062 |
| | | | | 280/650 |

FOREIGN PATENT DOCUMENTS

| | | |
|---|---|---|
| JP | 53-161464 | 12/1978 |
| JP | 3170838 U | 10/2011 |
| JP | 2019-64588 A | 4/2019 |
| JP | 2020-521669 A | 7/2020 |
| TW | 540504 | 7/2003 |

* cited by examiner

CARRIER FRAME

FIELD OF THE INVENTION

The present invention relates to a carrier frame according to the pre-characterizing clause of claims 1 and 29.

BACKGROUND OF THE INVENTION

A carrier frame often adopts a foldable design for easily portable for a user. As such, the carrier frame can be expanded completely in a use state or be folded to a compact size in a non-use state for storage or portable.

Conventional carrier frames can be operated so that a front leg, a rear leg, and a handle of the carrier frame are folded. Therefore, there are foldable mechanisms between the front leg and the rear leg, between the front leg and the handle, or between the rear leg and the handle, respectively. As such, when the user wants to fold the carrier frame, the user must bend over to fold the front leg and the rear leg first and then fold the handle to complete the folding of the carrier frame. As a result, the aforesaid foldable design not only causes complicated folding processes since the user needs to use his hands to perform multiple folding operations, but also causes the user much inconvenience since it requires the user to bend over to fold the carrier frame.

For solving the aforesaid problems, it is necessary to develop a carrier frame having a simple folding process.

SUMMARY OF THE INVENTION

One purpose of the present invention is to provide a carrier frame that can be released and folded synchronously and has advantages that the carrier frame is easy to fold, has a simple structure, and is convenient to operate.

Another purpose of the present invention is to provide a carrier frame that can improve the operational stability of the carrier frame and has advantages that the carrier frame is easy to fold, has a simple structure, and is convenient to operate.

This is achieved by a carrier frame according to claim 1 and a carrier frame according to claim 29. The dependent claims pertain to corresponding further developments and improvements. As will be seen more clearly from the detailed description following below, the claimed carrier frame provided by the present invention includes a first tubular member, a second tubular member and a third tubular member. The second tubular member is pivoted to the first tubular member. The third tubular member is pivoted to the second tubular member to form a pivot portion cooperatively with the first tubular member and the second tubular member. The carrier frame further includes a folding unit. The folding unit includes a pivot frame, a first rod, a linkage rod and a second rod. The pivot frame is hinged to the pivot portion and the second tubular member respectively. An end of the first rod is pivoted to the pivot frame at a first pivot point. Another end of the first rod is pivoted to the pivot frame at a second pivot point. An end of the linkage rod is pivoted to the first tubular member. Another end of the linkage rod is pivoted to the pivot frame at a third pivot point. An end of the second rod is pivoted to the third tubular member. Another end of the second rod is pivoted to the linkage rod at a fourth pivot point. The second pivot point, the third pivot point and the fourth pivot point are located at the same pivot axis. A folding of the first tubular member relative to the third tubular member drives the second rod via the linkage rod to be folded relative to the pivot frame, so as to fold the third tubular member relative to the second tubular member.

Compared with the prior art, the carrier frame of the present invention has the folding unit disposed thereon. The folding unit includes the pivot frame, the first rod, the linkage rod and the second rod. The pivot frame is pivoted to the pivot portion and the second tubular member. The end of the first rod is pivoted to the pivot frame at the first pivot point, and another end of the first rod is pivoted to the pivot frame at the second pivot point, so that the pivot frame and the first rod can cooperatively form a quadrilateral structure. The end of the linkage rod is pivoted to the first tubular member, and another end of the linkage rod is pivoted to the pivot frame at the third pivot point. The end of the second rod is pivoted to the third tubular member, and another end of the second rod is pivoted to the linkage rod at the fourth pivot point. The second pivot point, the third pivot point and the fourth pivot point are located at the same pivot axis, so as to make the pivot frame, the first rod and the second rod cooperatively form a linkage structure. Via the design in which the linkage rod drives the second rod to be folded relative to the pivot frame by the folding of the first tubular member relative to the third tubular member, the third tubular member can be folded relative to the second tubular member simultaneously, so as to achieve the purpose that the folding of the first folding tubular member relative to the third tubular member can drive the third tubular member to be folded relative to the second tubular member. In such a manner, the carrier frame of the present invention can be released and folded synchronously and have advantages that the carrier frame is easy to fold, has a simple structure, and is convenient to operate.

Preferably, the pivot frame includes a third rod connected to a fourth rod, the fourth rod connected to a fifth rod, and the fifth rod. The first rod is pivoted to the third rod at the first pivot point. The first rod is pivoted to the fifth rod at the second pivot point. The third rod is pivoted to the pivot portion.

Preferably, the second tubular member is connected to a joint where the fourth rod is connected to the fifth rod.

Preferably, the pivot frame and the first rod cooperatively form a trapezoid structure.

Preferably, the linkage rod has a recess for accommodating a location whereby the pivot frame is hinged to the pivot portion.

Preferably, the carrier frame further includes a guiderail. The guiderail is connected to the linkage rod, and the guiderail forms an upward handle structure when the first tubular member, the second tubular member and the third tubular member are folded relative to each other.

Preferably, the carrier frame further includes a first locking device for locking a rotation of the first tubular member relative to the third tubular member, and the first locking device is disposed on the pivot portion.

Specifically, the carrier frame further includes a fourth tubular member pivoted to the first tubular member, and a folding of the fourth tubular member relative to the first tubular member releases the first locking device.

Specifically, the first locking device includes a first pulling member, a pushing member, a first mounting base, a second mounting base and a locking member. The first tubular member is connected to the first mounting base. The third tubular member is connected to the second mounting base. The first mounting base is pivoted to the second mounting base. The locking member is movably disposed between the first mounting base and the second mounting base. The pushing member is located between the first mounting base and the locking member. The pushing member and the locking member abut against each other. An end of the first pulling member is connected to the pushing member, and when the first pulling member pulls the pushing member, the pushing member pushes the locking member to release the first mounting base from the second mounting base.

Specifically, a protrusion extends from the first mounting base toward the pushing member, and a ramped surface is formed on the pushing member corresponding to the protrusion. The end of the first pulling member is wound on the pushing member. The first pulling member pulls the pushing member to rotate for making the protrusion abut against the ramped surface, and the protrusion abuts against the ramped surface to make the pushing member push the locking member to move.

Specifically, the ramped surface is a spiral surface structure formed on the pushing member.

Specifically, a first winding slot is formed on the pushing member corresponding to the first pulling member, and the first pulling member is wound on the first winding slot.

Specifically, the first locking device further includes a first elastic member disposed between the second mounting base and the locking member.

Specifically, the locking member has an engaging tooth structure, a first tooth structure is formed on the first mounting base, and a second tooth structure is formed on the second mounting base. The first elastic member pushes the engaging tooth structure thereby for the engaging tooth structure to be engaged with the first tooth structure and the second tooth structure to lock the first mounting base and the second mounting base.

Specifically, the pushing member pushes the engaging tooth structure to overcome an elastic force of the first elastic member to be disengaged from the first tooth structure, to release the first mounting base from the second mounting base.

Specifically, the locking member is movable along a pivot shaft between the first mounting base and the second mounting base.

Specifically, the pushing member is movable along a pivot shaft between the first mounting base and the second mounting base.

Specifically, the first locking device further includes a driving member disposed through the first tubular member and the fourth tubular member and engaged with the fourth tubular member. Another end of the first pulling member is wound on the driving member, and a folding of the fourth tubular member relative to the first tubular member allows the driving member to rotate and pull the first pulling member.

Specifically, a second winding slot is formed on the driving member, and the first pulling member is wound on the second winding slot.

Specifically, the carrier frame further includes a locking structure locking the first tubular member and the fourth tubular member in a folded state.

Specifically, the locking structure includes a torsional spring. An end of the torsional spring is mounted on the driving member. Another end of the torsional spring has an engaging hook. A fixing pillar extends outward from the first tubular member. When the fourth tubular member is folded on the first tubular member, the driving member drives the engaging hook for the engaging hook to be engaged with the fixing pillar.

Specifically, an insertion slot corresponding to the torsional spring is formed on the driving member.

Specifically, the carrier frame further includes a second locking device disposed between the first tubular member and the fourth tubular member for locking a rotation of the fourth tubular member relative to the first tubular member.

Specifically, the second locking device includes a second pulling member, an engaging member, a mating member, a first fixing member, a second fixing member and an operating member. The first tubular member is connected to the first fixing member. The fourth tubular member is connected to the second fixing member. The first fixing member is connected to the second fixing member, the mating member is connected to the first fixing member. The engaging member is slidably disposed on the second fixing member. The engaging member is engaged with the mating member to lock the first tubular member and the fourth tubular member in an expanded state. An end of the second pulling member is connected to the operating member. Another end of the second pulling member is connected to the engaging member. The operating member is operated to disengage the engaging member from the mating member via the second pulling member.

Specifically, the first fixing member and the second fixing member are fitted with and pivoted to each other.

Specifically, the second locking device further includes a second elastic member. The second elastic member provides an elastic force for making the engaging member engaged with the mating member.

Specifically, a pillar extends from the engaging member toward the mating member. An engaging hole structure is formed on the mating member corresponding to the pillar.

Specifically, when the fourth tubular member is folded on the first tubular member, the first tubular member and the fourth tubular member cooperatively form a support foot structure.

For achieving the aforesaid purposes, a carrier frame provided by the present invention includes a first tubular member, a second tubular member, a third tubular member and a fourth tubular member. The second tubular member is pivoted to the first tubular member. The third tubular member is pivoted to the second tubular member. The fourth tubular member is pivoted to the first tubular member. The fourth tubular member is foldable relative to the first tubular member. The carrier frame further includes a locking structure locking the first tubular member and the fourth tubular member in a folded state.

Preferably, the locking structure includes a torsional spring. An end of the torsional spring is mounted on a driving member located at the fourth tubular member. Another end of the torsional spring has an engaging hook, and a fixing pillar extends outward from the first tubular member. When the fourth tubular member is folded on the first tubular member, the driving member drives the engaging hook to be engaged with the fixing pillar.

Specifically, an insertion slot is formed on the driving member for placing the torsional spring.

Specifically, after the fourth tubular member is folded on the first tubular member, the first tubular member and the fourth tubular member cooperatively form a support foot structure.

Compared with the prior art, since the carrier frame of the present invention includes the locking structure disposed between the first tubular member and the fourth tubular member for locking the first tubular member and the fourth tubular member in a folded state, the present invention can prevent accidental expanding of the carrier frame during the transportation process, improves folding stability of the carrier frame, and has advantages that the carrier frame has a simple structure and is convenient to use.

BRIEF DESCRIPTION OF THE DRAWINGS

In the following, the invention is further illustrated by way of example, taking reference to the accompanying drawings thereof.

DETAILED DESCRIPTION

Figure 1:
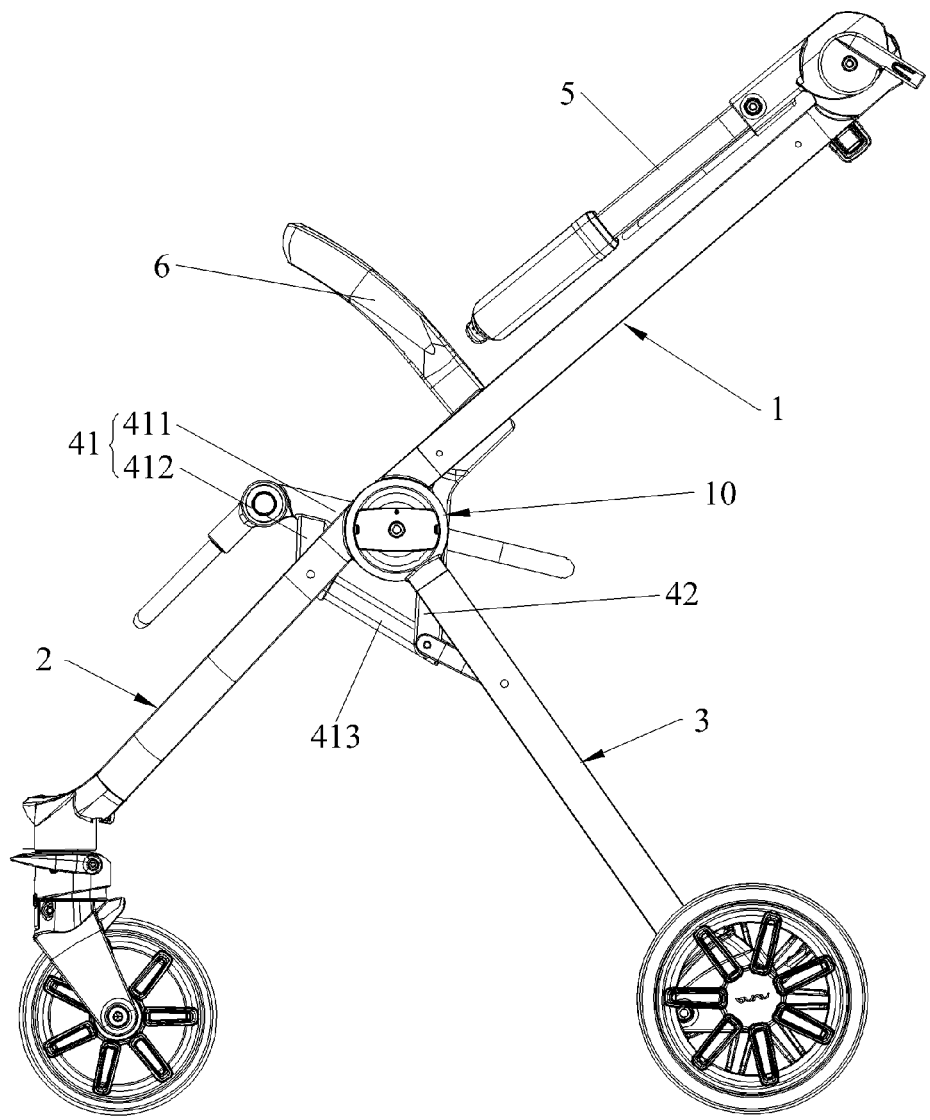
FIG. 1 is a side view of a carrier frame when a fourth tubular member is folded on a first tubular member and the first tubular member, a second tubular member and a third tubular member are during a folding process according to an embodiment of the present invention.
Figure 2:
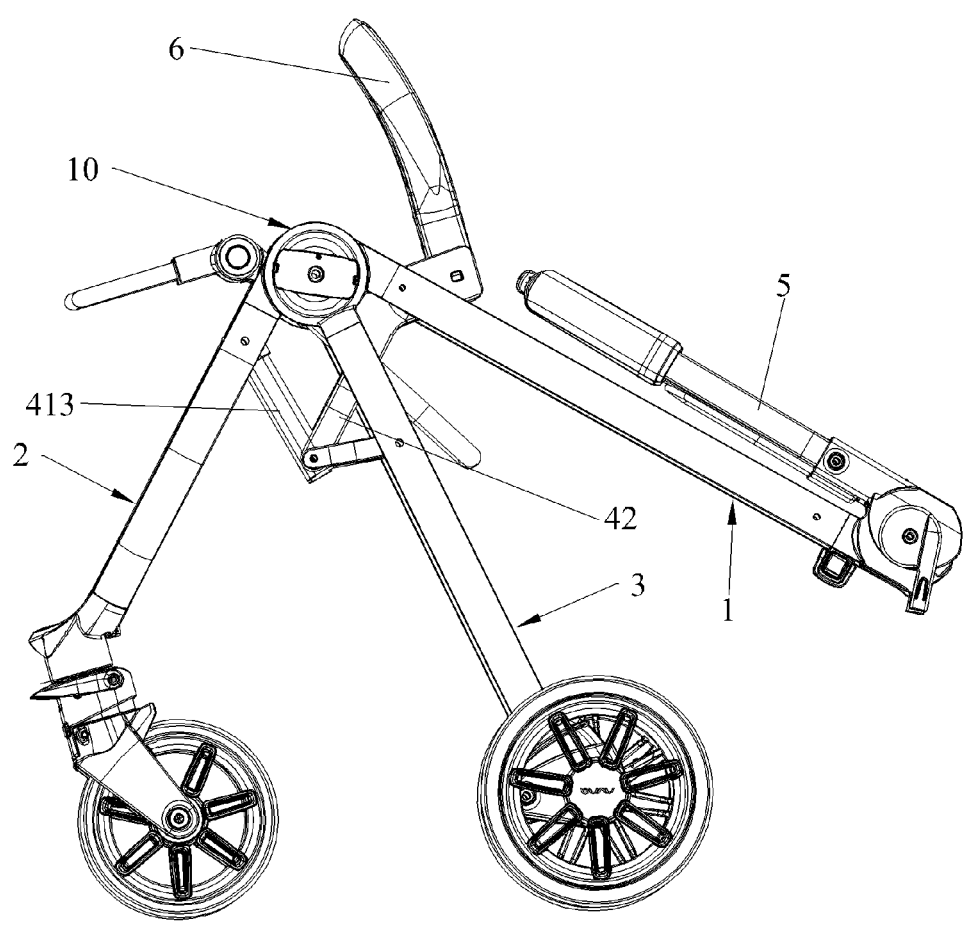
FIG. 2 is a side view of the carrier frame of the present invention when the fourth tubular member is folded on the first tubular member and the first tubular member, the second tubular member and the third tubular member are folded relative to each other.

The embodiments of the present invention will now be described with reference to the accompanying drawings.

Please refer to FIGS. 1-7. A carrier frame 100 provided by the present invention includes a first tubular member 1, a second tubular member 2, and a third tubular member 3. The first tubular member 1 is pivoted to the second tubular member 2 to be foldable relative to the second tubular member 2. The second tubular member 2 is pivoted to the third tubular member 3 to make the third tubular member foldable relative to the second tubular member 2. The first tubular member 1, the second tubular member 2 and the third tubular member 3 are pivoted at the same point to cooperatively form a pivot portion 10. The carrier frame 100 further includes a folding unit 4. The folding unit 4 includes a pivot frame 41, a first rod 42, a linkage rod 43, and a second rod 44. The pivot frame 41 is hinged to the pivot portion 10 and the second tubular member 2. A pivot point between the pivot frame 41 and the pivot portion 10 and a pivot point between the pivot frame 41 and the second tubular member 2 are spaced away from each other. An end of the first rod 42 is pivoted to the pivot frame 41 at a first pivot point a, and another end of the first rod 42 is pivoted to the pivot frame 41 at a second pivot point b. The first pivot point a and the second pivot point b are spaced away from each other to make the pivot frame 41 and the first rod 42 cooperatively form a quadrilateral structure. An end of the linkage rod 43 is pivoted to the first tubular member 1, and another end of the linkage rod 43 is pivoted to the pivot frame 41 at the third pivot point. The linkage rod 43 is a sheet-like structure and has a recess 431 for accommodating a location where the pivot frame 41 is hinged to the pivot portion 10, so as to prevent interference between the linkage rod 43 and the pivot frame 41 to make each component of the carrier frame 100 more compact. An end of the second rod 44 is pivoted to the third tubular member 3, and another end of the second rod 44 is pivoted to the linkage rod 43 at a fourth pivot point. The second pivot point b, the third pivot point and the fourth pivot point are located at the same pivot axis, so as to make the pivot frame 41, the first rod 42 and the second rod 44 cooperatively form a linkage structure. Via a folding of the first tubular member 1 relative to the third tubular member 3, the linkage rod 43 can fold the second rod 44 relative to the pivot frame 41, so as to fold the third tubular member 3 relative to the second tubular member 2. As such, the purpose that the folding of the first tubular member 1 relative to the third tubular member 3 can synchronously drive the third tubular member 3 to be folded relative to the second tubular member 2 is achieved. When the carrier frame 100 is folded, a rotation of the first tubular member 1 relative to the third tubular member 3 can simultaneously drive the second tubular member 2 and the third tubular member 3 to approach each other for completing the folding operation of the carrier frame 100. Thus, since a user just needs to rotate the first tubular member 1 and then the third tubular member 3 can be folded relative to the second tubular member 2 synchronously, there is no need to further perform a folding of the second tubular member 2 and the third tubular member 3, so as to improve the use convenience of the carrier frame 100. The carrier frame 100 of the present invention is suitable for a foldable device, such as a scaffold, a folding ladder, a folding wheelchair and a stroller, but not limited thereto. More detailed description for an embodiment that the carrier frame 100 is applied to a stroller as shown in FIGS. 1-19 is provided as follows. In this embodiment, the first tubular member 1 of the carrier frame 100 is a handle of the stroller, the second tubular member 2 is a front leg of the stroller, and the third tubular member 3 is a rear leg of the stroller. As such, the user can rotate the handle to move the front leg and the rear leg close to or away from each other for folding or expanding the carrier frame 100. That is to say, the user can just operate the handle to complete the folding or expanding operation of the carrier frame 100, so as to solve the prior art problem that the user must bend over to fold the front leg and the rear leg of the stroller. Thus, the operational convenience of the stroller is improved.

To be more specific, please refer to FIGS. 4-7. The pivot frame 41 includes a third rod 411, a fourth rod 412, and a fifth rod 413. The first rod 42 is pivoted to the third rod 411 at the first pivot point a, the first rod 42 is pivoted to the fifth rod 413 at the second pivot point b, the third rod 411 is pivoted to the pivot portion 10, and the second tubular member 2 is pivoted to a joint where the fourth rod 412 is connected to the fifth rod 413. In such a manner, the first rod 42, the second rod 44, the third rod 411, the fourth rod 412, and the fifth rod 413 can cooperatively form a linkage mechanism. As such, the folding of the first tubular member 1 relative to the third tubular member 3 can drive the third tubular member 3 to be folded relative to the second tubular member 2 synchronously. Preferably, the pivot frame 41 could form a trapezoid structure cooperatively with the first rod 42. In this embodiment, the pivot frame 41 and the first rod 42 cooperatively form a right-trapezoid-like structure.

Figure 3:
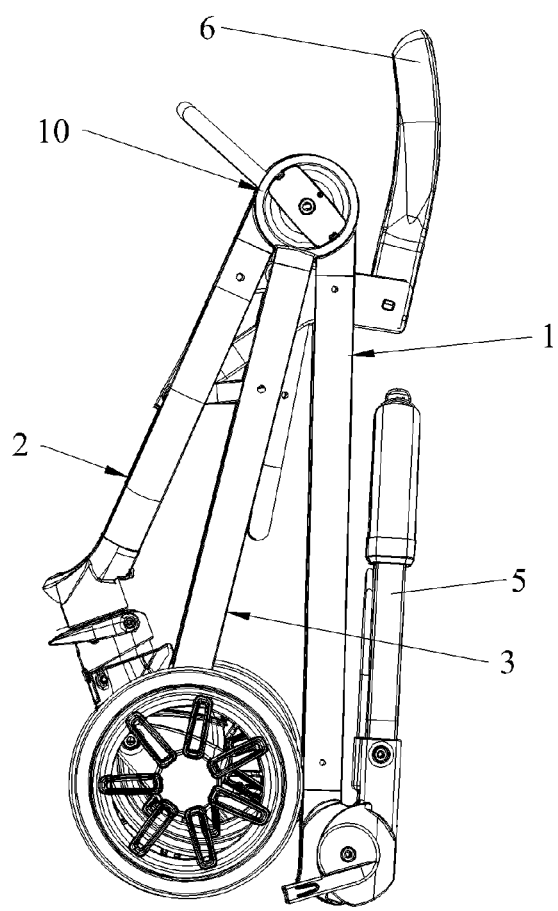
FIG. 3 is a side view of the carrier frame of the present invention when the first tubular member, the second tubular member, the third tubular member and the fourth tubular member are in a folded state.

Please refer to FIGS. 1-4, the carrier frame 100 provided by the present invention further includes a guardrail 6. The guardrail 6 is connected to the linkage rod 43. When the first tubular member 1, the second tubular member 2, and the third tubular member 3 are folded together relative to each other, the guardrail 6 forms an upward handle structure (as shown in FIG. 3) for convenient transportation of the carrier frame 100, so as to improve the use convenience of the carrier frame 100.

Please refer to FIGS. 8-16. The carrier frame 100 further includes a first locking device 7 and a fourth tubular member 5. The first locking device 7 is used to lock the rotation of the first tubular member 1 relative to the third tubular member 3. The first locking device 7 is disposed on the pivot portion 10. The fourth tubular member 4 is pivoted to the first tubular member 1. The first locking device 7 can be released via a folding of the fourth tubular member 5 relative to the first tubular member 1. In other words, there is no need to additionally dispose an operating member 96 on the first locking device 7, which means that the user just needs to rotate the first tubular member 1 and the fourth tubular member 5 for releasing the first locking device 7. For example, the first locking device 7 includes a first pulling member 71, a pushing member 72, a first mounting base 73, a second mounting base 74, a locking member 75, and a first elastic member 76. The first tubular member 1 is connected to the first mounting base 73, the third tubular member 3 is connected to the second mounting base 74, and the first mounting base 73 is pivoted to the second mounting base 74. In such a manner, a rotation of the first mounting base 73 relative to the second mounting base 74 can drive the first tubular member 1 to rotate relative to the third tubular member 3, and locking the first mounting base 73 and the second mounting base 74 can lock the rotation of the first tubular member 1 relative to the third tubular member 3. The locking member 75 is movably disposed between the first mounting base 73 and the second mounting base 74. The pushing member 72 is located between the first mounting base 73 and the locking member 75. The pushing member 72 and the locking member 75 abut against each other. The first elastic member 76 is disposed between the second mounting base 74 and the locking member 75 and has a tendency to bias the locking member 75 against the first mounting base 73, so as to make the pushing member 72 and the locking member 75 abut against each other. An end of the first pulling member 71 is connected to the pushing member 72. When the fourth tubular member 5 is folded relative to the first tubular member 1, the first pulling member 71 pulls the pushing member 72 to move the locking member 75 along a pivot shaft between the first pivot base 73 and the second pivot base 74. The pushing member 72 moves along the pivot shaft between the first mounting base 73 and the second mounting base 74 for releasing the first mounting base 73 from the second mounting base 74.

Please refer to FIG. 8 and FIGS. 10-16. A protrusion 731 extends from the first mounting base 73 toward the pushing member 72, and a ramped surface 721 is formed on the pushing member 72 corresponding to the protrusion 731. An end of the first pulling member 71 is wound on the pushing member 72. The first pulling member 71 pulls the pushing member 72 to rotate, so as to make the protrusion 731 abut against the ramped surface 721. As such, by abutting of the protrusion 731 against the ramped surface 721, the pushing member 72 can push the locking member 75 to move. In other words, with a rotation of the pushing member 72, abutting of the protrusion 731 against the ramped surface 721 can make the pushing member 72 move along the pivot shaft between the first mounting base 73 and the second mounting base 74. Accordingly, the pushing member 72 can push the locking member 75 to move along the pivot shaft between the first mounting base 73 and the second mounting base 74 for locking or releasing the first mounting base 73 and the second mounting base 74. The ramped surface 721 is a spiral surface structure formed on the pushing member 72. In this embodiment, three protrusions 731 are formed on the first mounting base 73 and are symmetrically disposed relative to the pivot shaft between the first mounting base 73 and the second mounting base 74. The three protrusions 731 are equally spaced on the first mounting base 73. Correspondingly, three ramped surfaces 721 are formed on the pushing member 72 and are symmetrically disposed relative to the pivot shaft between the first mounting base 73 and the second mounting base 74. The three ramped surfaces 721 are equally spaced on the pushing member 72. Furthermore, a first winding slot 722 is formed on the pushing member 72 corresponding to the first pulling member 71, and the first pulling member 71 is wound on the first winding slot 722 for preventing interference between each component of the carrier frame 100, so as to make each component of the carrier frame 100 more compact. Preferably, the first pulling member 71 is a steel wire rope, but not limited thereto.

Figure 13:
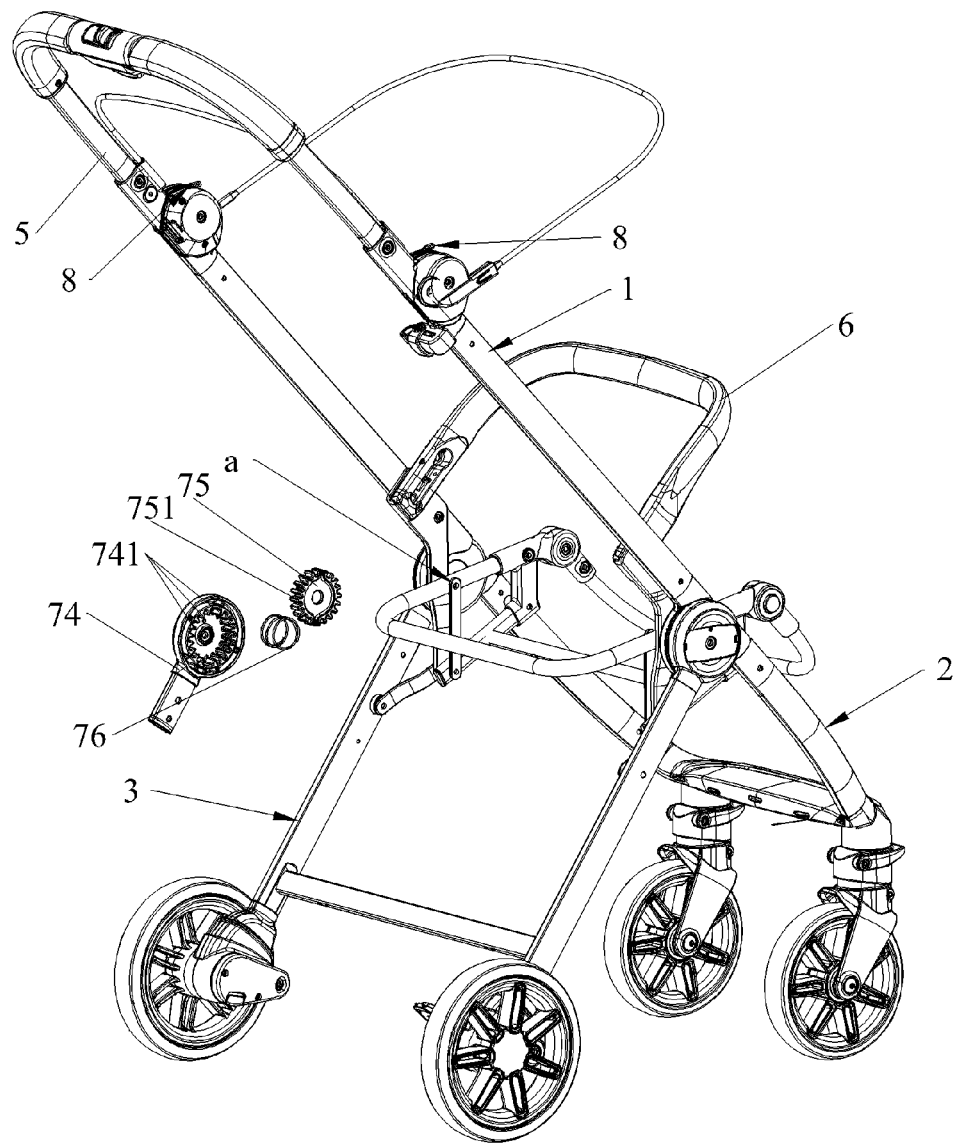
FIG. 13 is a partial exploded diagram of the carrier frame of the present invention in the expanded state at another viewing angle.
Figure 14:
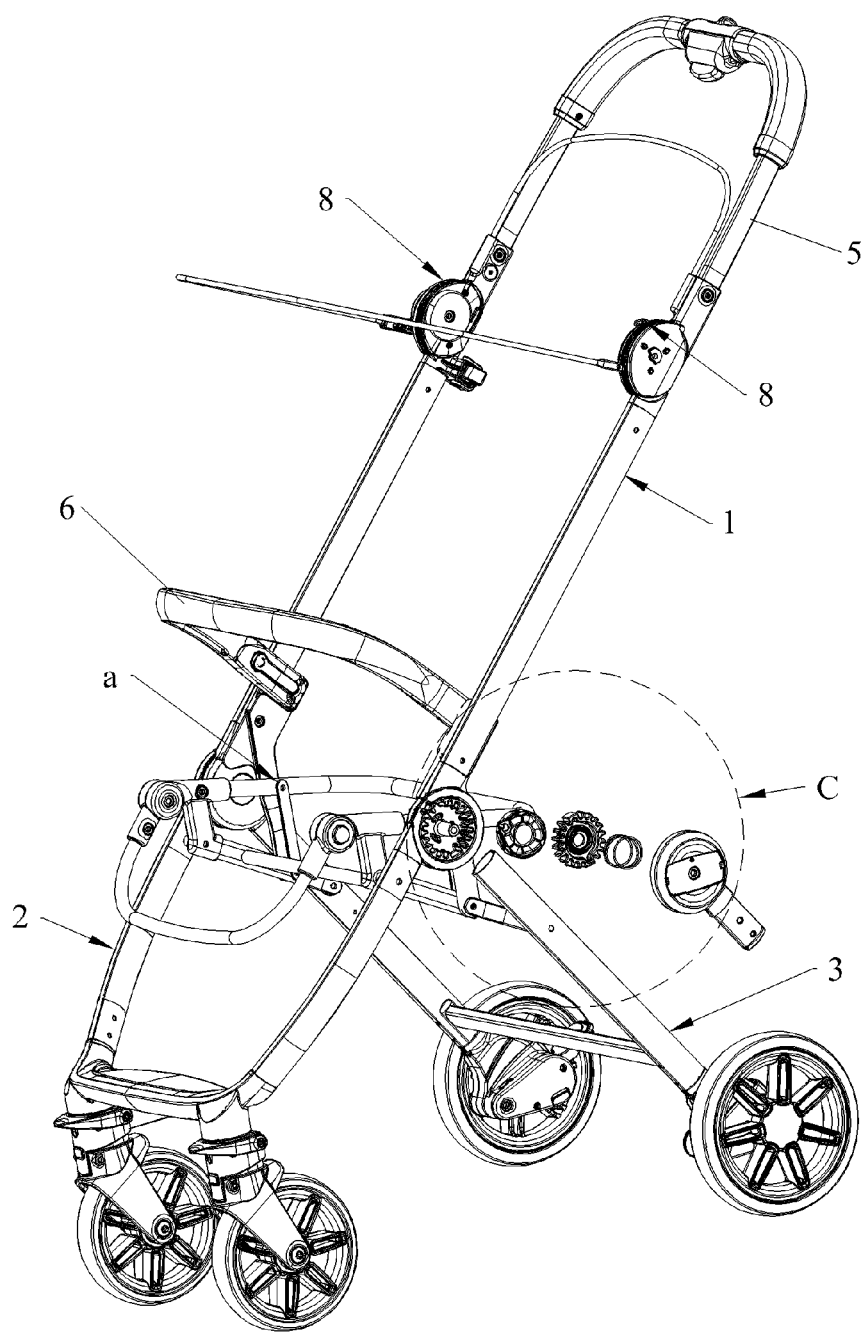
FIG. 14 is a partial exploded diagram of the carrier frame of the present invention in the expanded state.
Figure 15:
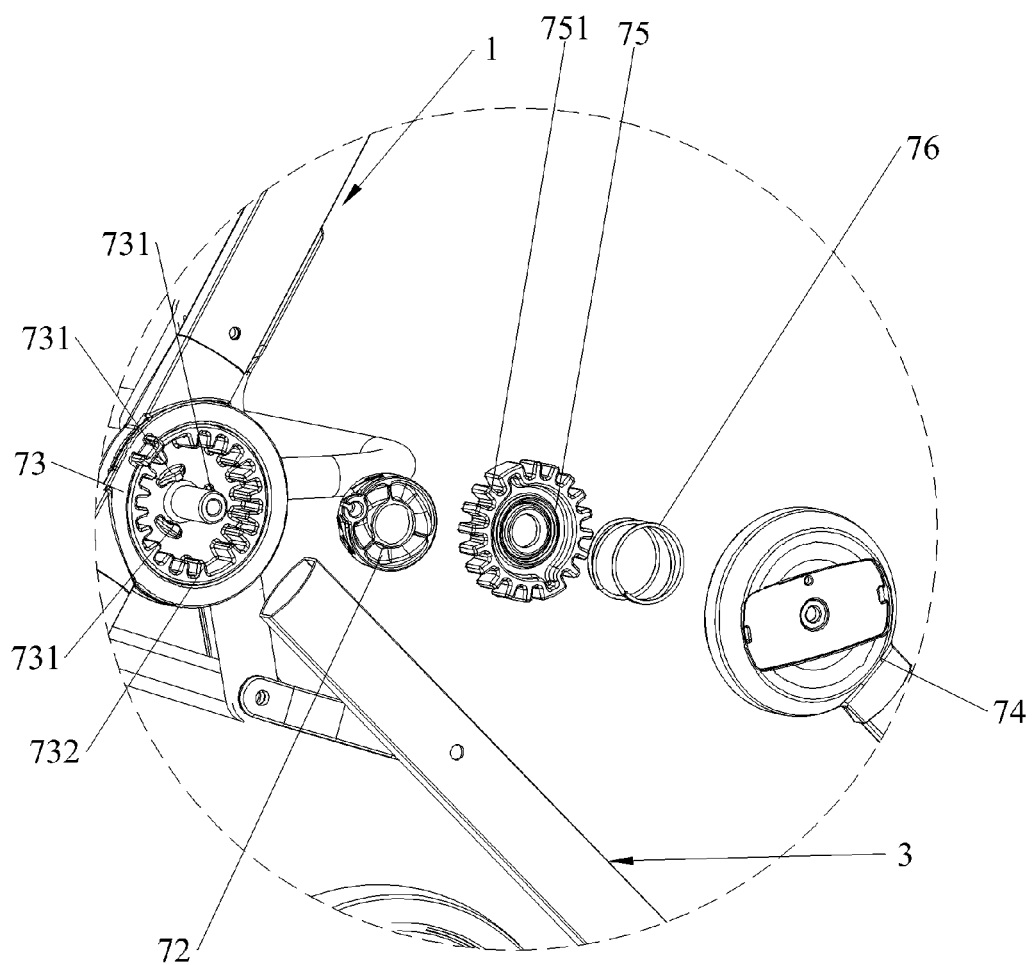
FIG. 15 is an enlarged diagram of the carrier frame at a region "C" in FIG. 14.
Figure 16:
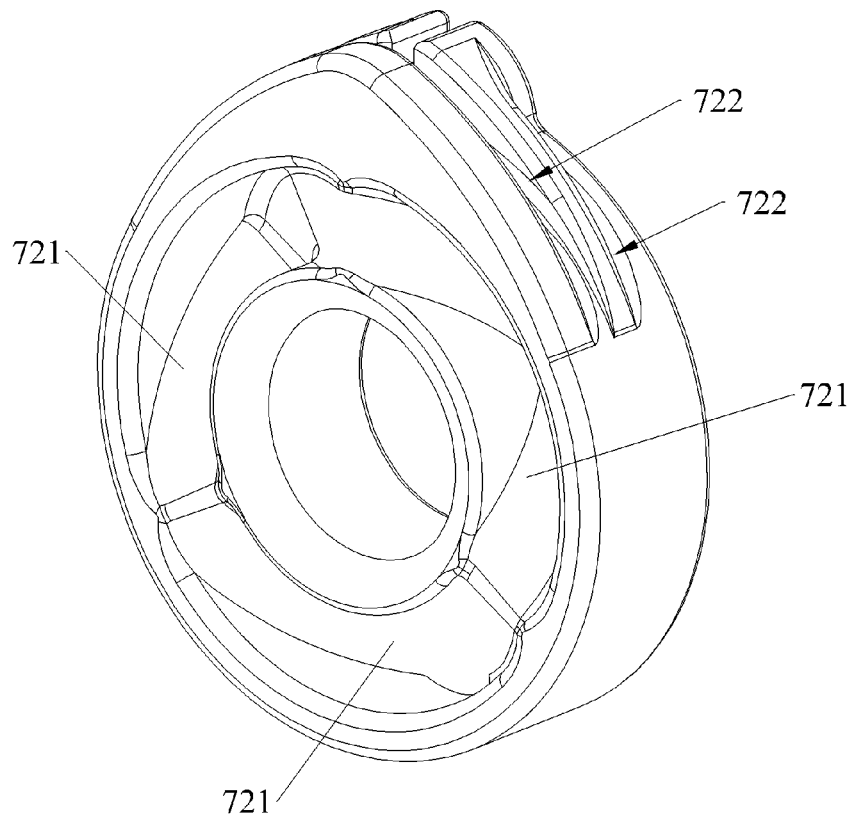
FIG. 16 is a diagram of a pushing member of the carrier frame of the present invention.
Figure 17:
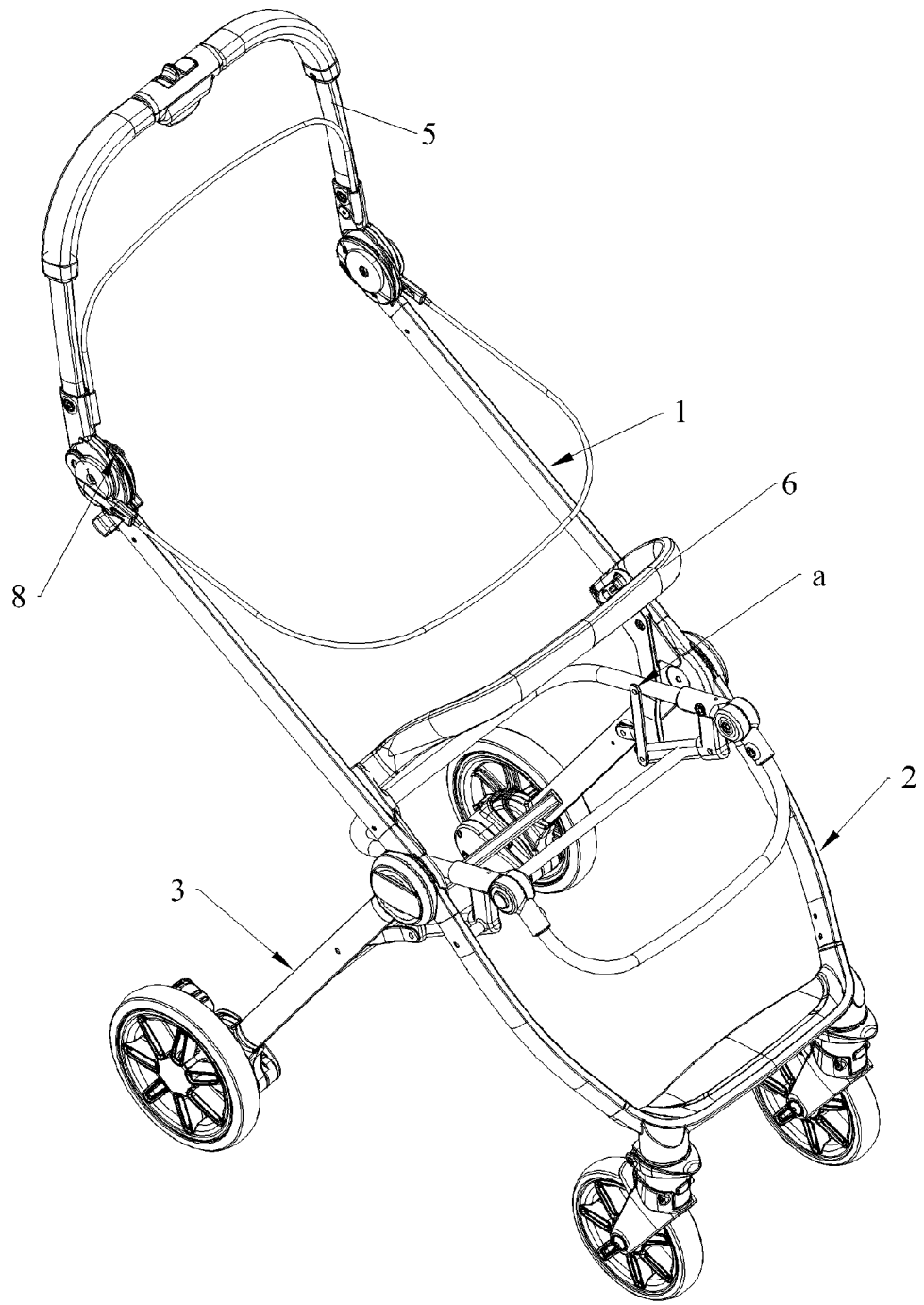
FIG. 17 is a diagram of the carrier frame of the present invention when the fourth tubular member is folded relative to the first tubular member.

Please refer to FIGS. 13-15. The locking member 75 has an engaging tooth structure 751, a first tooth structure 732 is formed in the first mounting base 73 corresponding to the engaging tooth structure 751, and a second tooth structure 741 is formed in the second mounting base 74 corresponding to the engaging tooth structure 751. The first elastic member 76 can push the engaging tooth structure 751 to be simultaneously engaged with the first tooth structure 732 and the second tooth structure 741 for locking the first mounting base 73 and the second mounting base 74. On the other hand, the pushing member 72 can push the engaging tooth structure 751 to overcome an elastic force of the first elastic member 76, so that the engaging tooth structure 751 can be disengaged from the first tooth structure 732 for releasing the first mounting base 73. That is to say, when the engaging tooth structure 751 is simultaneously engaged with the first tooth structure 732 and the second tooth structure 741, the engaging tooth structure 751 can lock a position of the first tooth structure 732 relative to the second tooth structure 741 for preventing the first mounting base 73 from rotating relative to the second mounting base 74, so as to fix a pivot angle of the first tubular member 1 relative to the third tubular member 3. When the engaging tooth structure 751 is pushed by the pushing member 72 to overcome the elastic force to be disengaged from the first tooth structure 732 and then completely engaged with the second tooth structure 741, the engaging tooth structure 751 no longer constrains a position of the first tooth structure 732 relative to the second tooth structure 741. As a result, the first mounting base 73 can be rotatable relative to the second mounting base 74 to achieve free rotation of the first tubular member 1 relative to the third tubular member 3. In summary, the carrier frame 100 has a simple locking design and is easy to operate. Preferably, the engaging tooth structure 751 is formed in a circumferential distribution. Correspondingly, the first tooth structure 732 and the second tooth structure 741 are formed in a circumferential distribution, to make locking of the engaging tooth structure 751 more stable.

Please refer to FIGS. 8-10 and FIGS. 18-19. The first locking device 7 further includes a driving member 77. A first fixing member 94 is connected to the first tubular member 1, and a second fixing member 95 is connected to the fourth tubular member 5. The driving member 77 is disposed through the first fixing member 94 and the second fixing member 95. The driving member 77 is engaged with the fourth tubular member 5. Another end of the first pulling member 71 is wound on the driving member 77. Via the folding of the fourth tubular member 5 relative to the first tubular member 1, the driving member 77 can rotate accordingly to pull the first pulling member 71, such that the first pulling member 71 can pull the pushing member 72 to rotate. Specifically, a second winding slot 771 is formed on the driving member 77 corresponding to the first pulling member 71, and the first pulling member 71 is wound on the second winding slot 771 for preventing interference between each component of the carrier frame 100, so as to make each component of the carrier frame 100 more compact.

Figure 18:
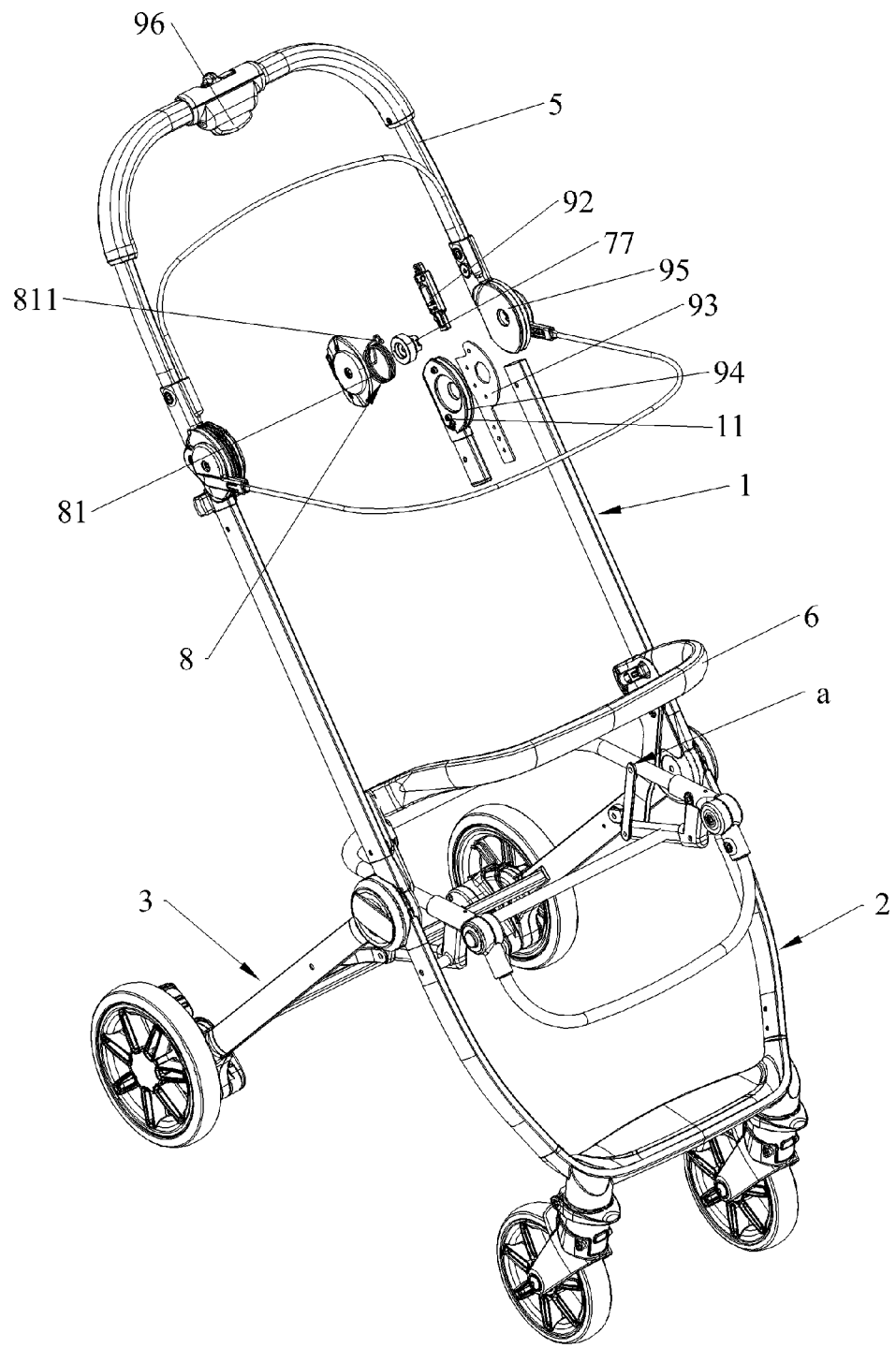
FIG. 18 is another partial exploded diagram of the carrier frame of the present invention in the expanded state.
Figure 19:
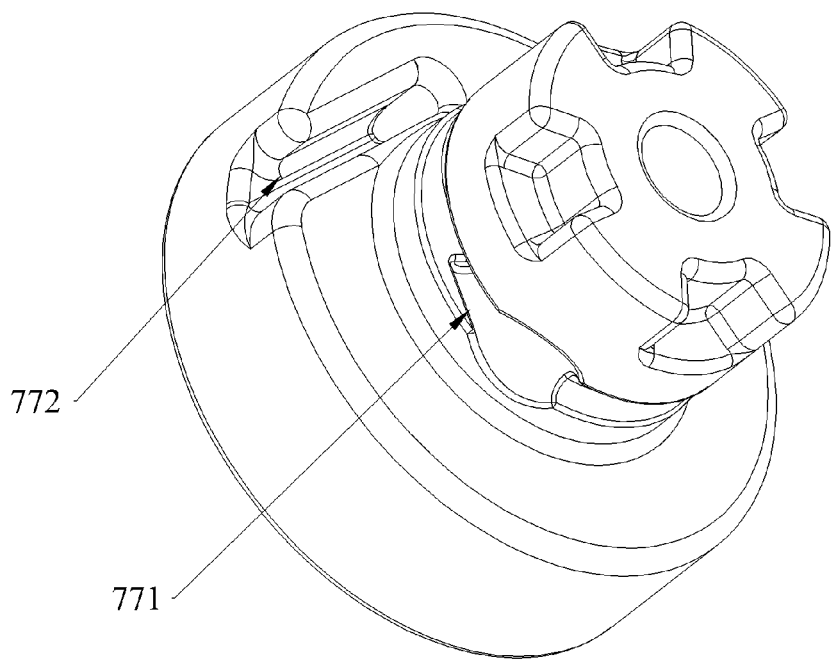
FIG. 19 is a diagram of a driving member of the carrier frame of the present invention.

Please refer to FIG. 18, the carrier frame 100 provided by the present invention further includes a locking structure 8 to lock the first tubular member 1 and the fourth tubular member 5 in a folded state. For example, the locking structure 8 includes a torsional spring 81. The driving member 77 is fixedly engaged with the fourth tubular member 5. A rotation of the fourth tubular member 5 relative to the first tubular member 1 can drive the driving member 77 to rotate. An end of the torsional spring 81 is connected to the driving member 77 on the fourth tubular member 5, and another end of the torsional spring 81 has an engaging hook 811. A fixing pillar 11 extends outward from the first tubular member 1 corresponding to the engaging hook 811 and is formed on the first fixing member 94. When the fourth tubular member 5 is folded relative to the first tubular member 1, the driving member 77 drives the engaging hook 811 to be engaged with the fixing pillar 11, so as to lock the first tubular member 1 and the fourth tubular member 5. The first tubular member 1 and the fourth tubular member 5 can cooperatively form an anti-tip support foot structure after the fourth tubular member 5 is folded relative to the first tubular member 1, so as to efficiently prevent the carrier frame 100 from tipping over after being folded. Specifically, an insertion slot 772 corresponding to the torsional spring 81 is formed on the driving member 77. The torsional spring 81 can be mounted on the driving member 77 through the insertion slot 772 for preventing interference between the first pulling member 71 and the torsional spring 81.

Figure 8:
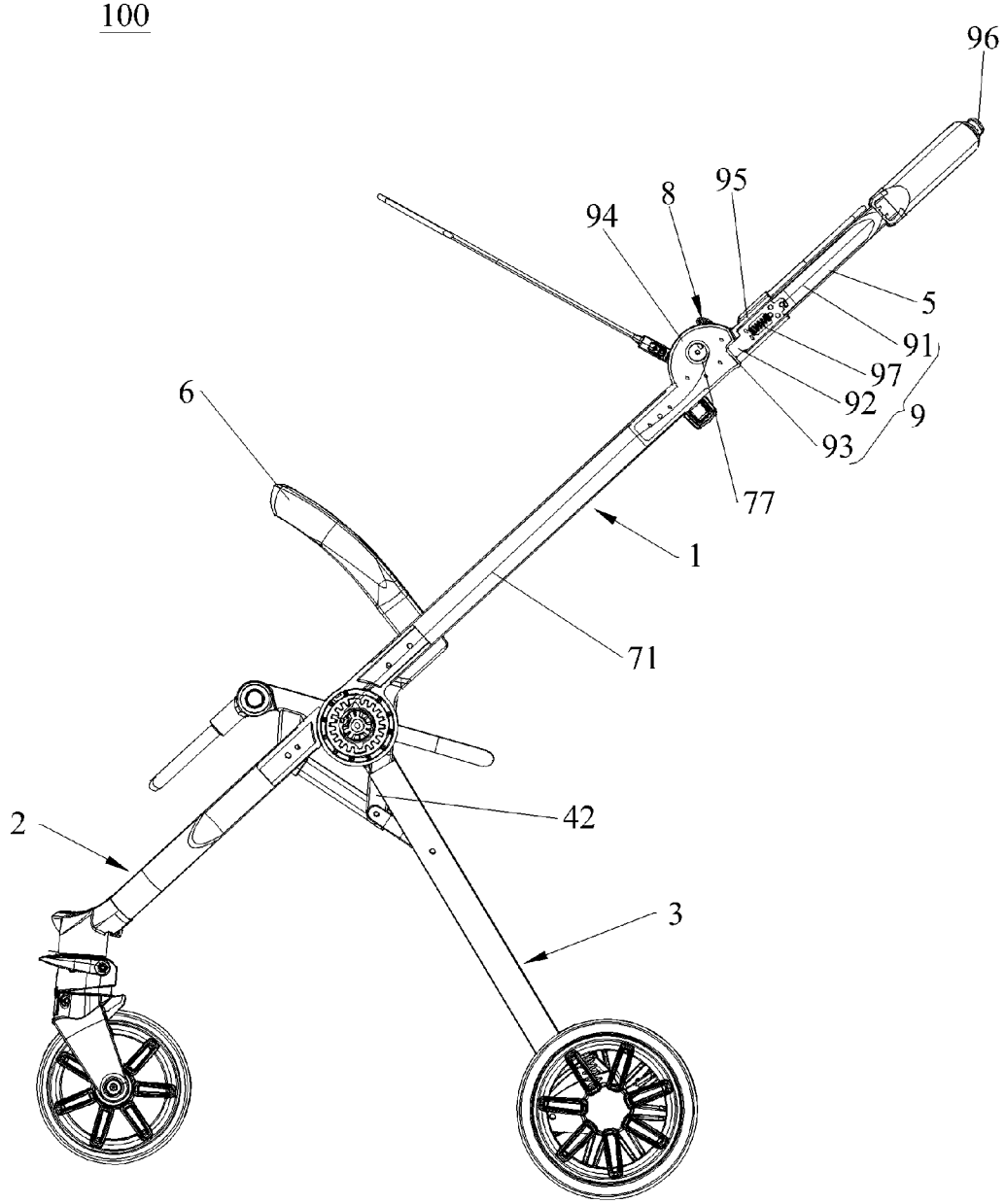
FIG. 8 is a side view of the carrier frame of the present invention in the expanded state.
Figure 9:
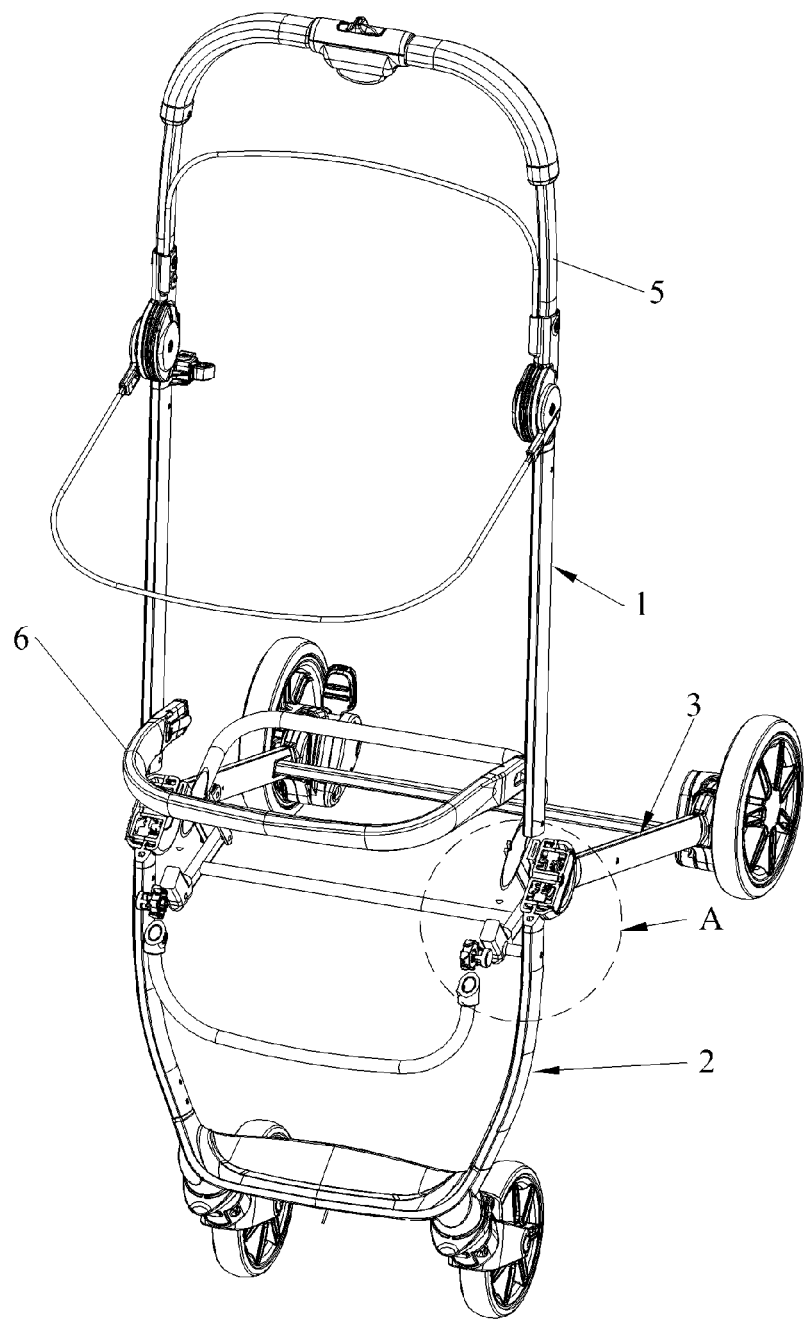
FIG. 9 is a partial cross-sectional diagram of the carrier frame of the present invention in the expanded state.
Figure 10:
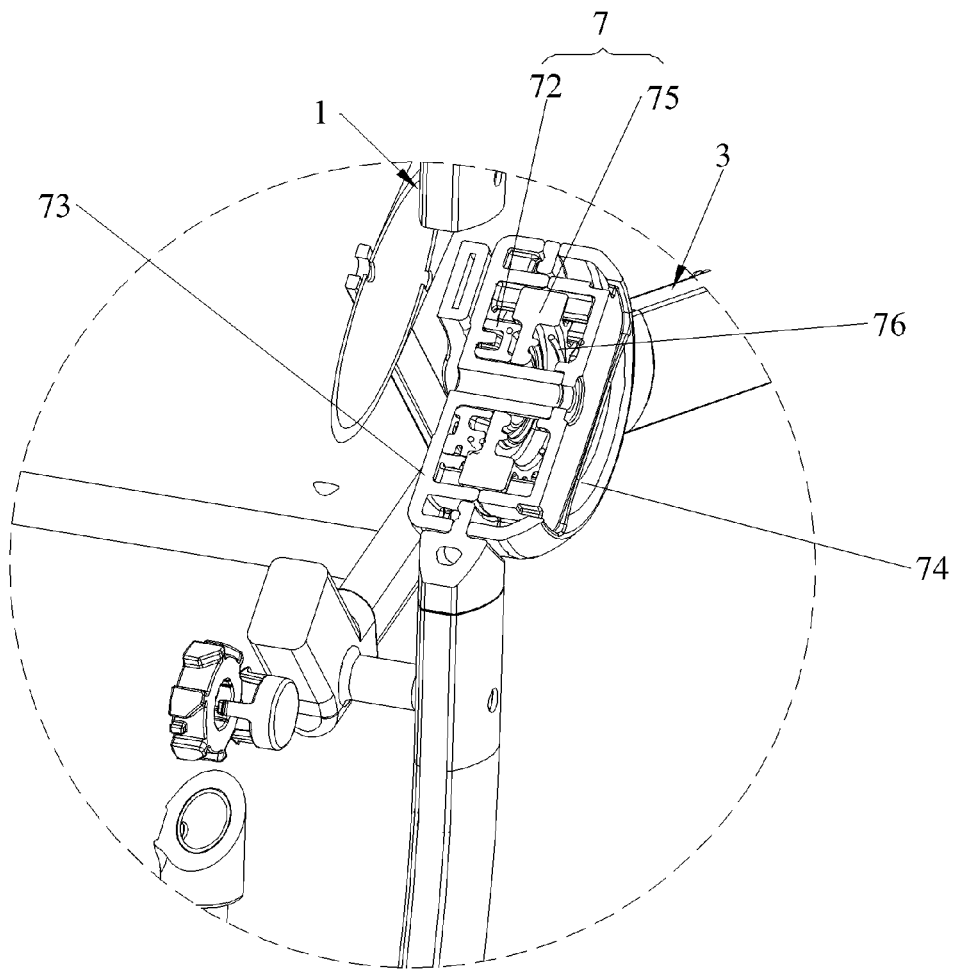
FIG. 10 is an enlarged diagram of the carrier frame at a region "A" in FIG. 9.
Figure 11:
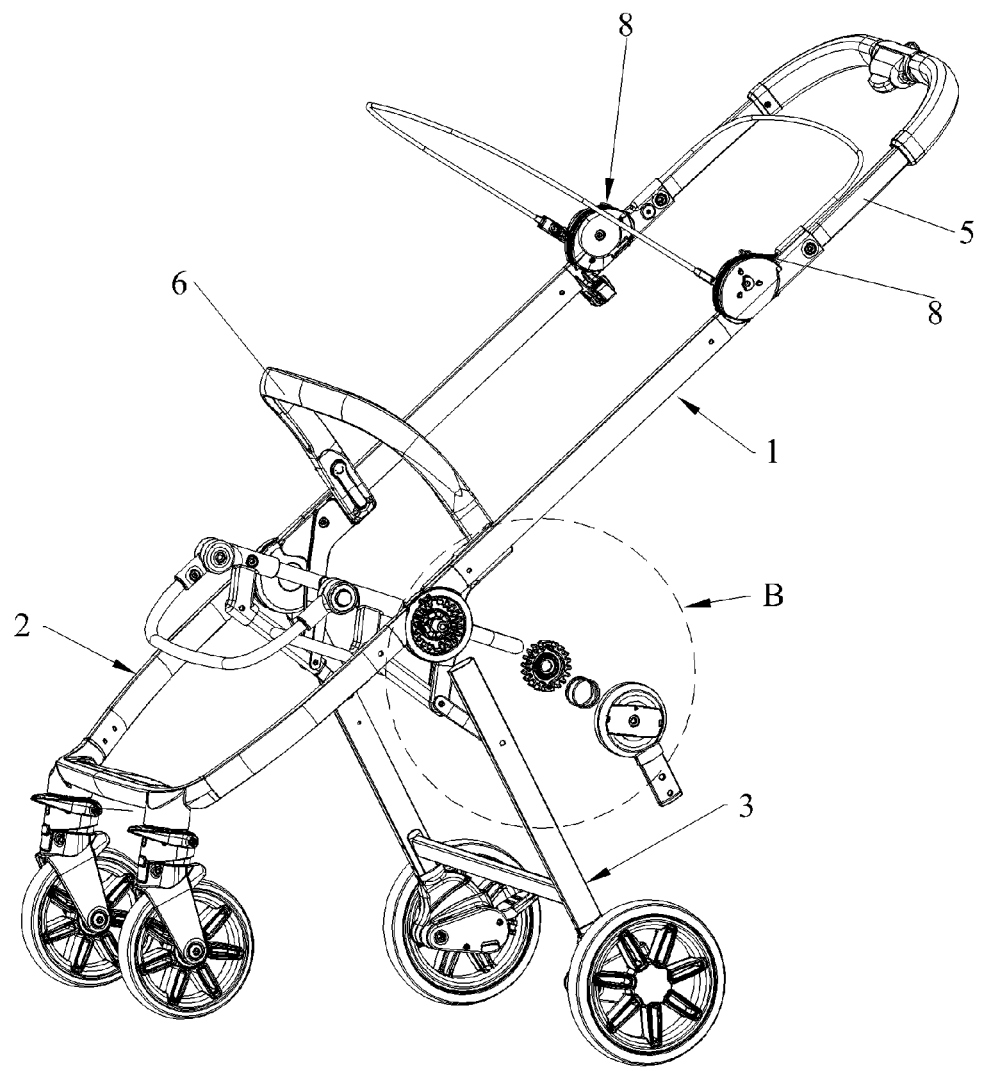
FIG. 11 is a partial exploded diagram of the carrier frame of the present invention in the expanded state.
Figure 12:
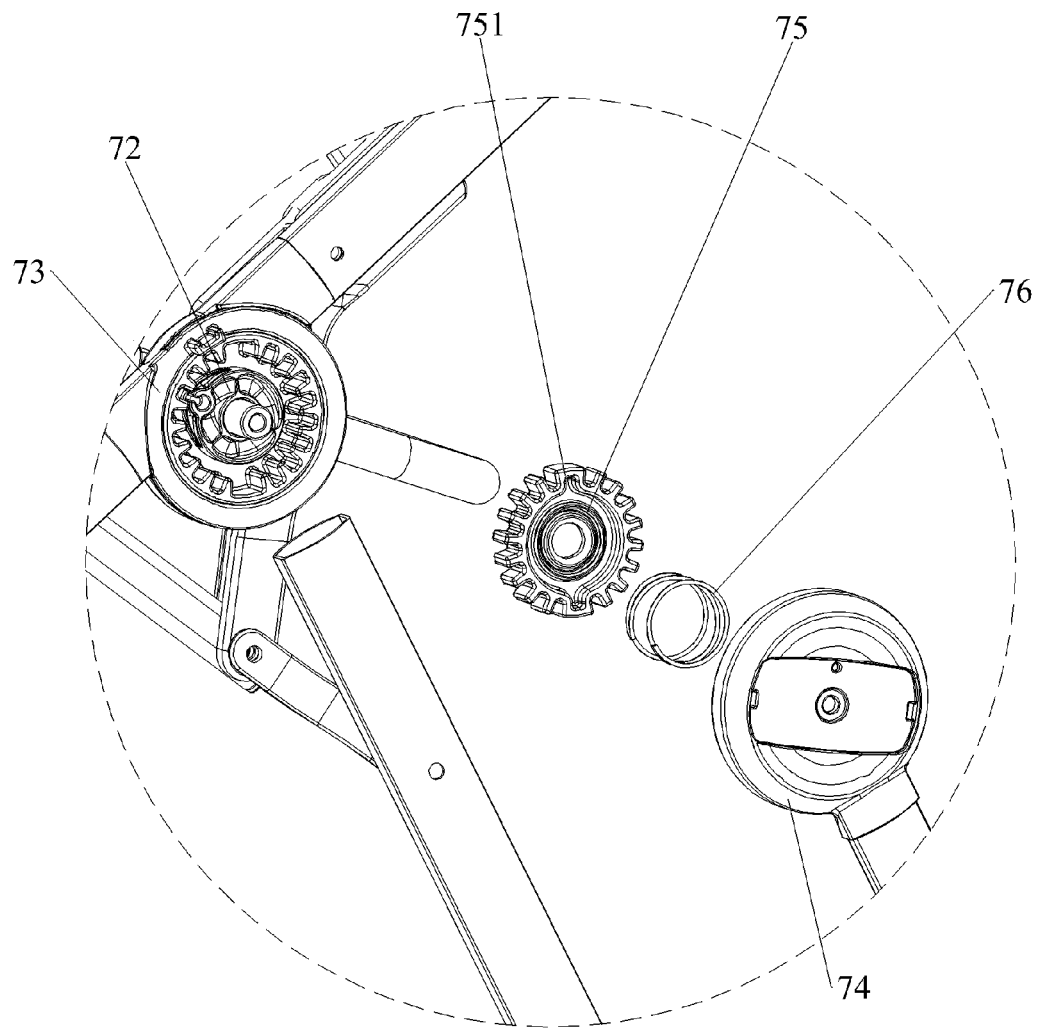
FIG. 12 is an enlarged diagram of the carrier frame at a region "B" in FIG. 10.

Please refer to FIG. 8 and FIG. 18. The carrier frame 100 provided by the present invention further includes a second locking device 9. The second locking device 9 is used to lock the rotation of the fourth tubular member 5 relative to the first tubular member 1. The second locking device 9 is disposed between the first tubular member 1 and the fourth tubular member 5. For example, the second locking device 9 includes a second pulling member 91, an engaging member 92, a mating member 93, the first fixing member 94, the second fixing member 95, the operating member 96, and a second elastic member 97. The first tubular member 1 is connected to the first fixing member 94. The fourth tubular member 5 is connected to the second fixing member 95. The first fixing member 94 is fitted with and pivoted to the second fixing member 95. The mating member 93 is fitted within the first fixing member 94 and is connected to the second fixing member 95. The second elastic member 97 is disposed in the fourth tubular member 5. An end of the second elastic member 97 is connected to the fourth tubular member 5, and another end of the second elastic member 97 is disposed in and connected to the engaging member 92. The engaging member 92 is slidably disposed on the second fixing member 95. The second elastic member 97 provides an elastic force to make the engaging member 92 engaged with the mating member 93 for locking the first tubular member 1 and the fourth tubular member 5 in an expanded state. An end of the second pulling member 91 is connected to the operating member 96, and another end of the second pulling member 91 is connected to the engaging member 92. The second pulling member 91 is movable along an axial direction of the fourth tubular member 5. The operating member 96 can be operated to pull the second pulling member 91. Accordingly, the second pulling member 91 can pull the engaging member 92 to overcome the elastic force of the second elastic member 97 and then be disengaged from the mating member 93. As a result, the second fixing member 95 is freely-rotatable relative to the first fixing member 94, such that the fourth tubular member 5 can rotate freely relative to the first tubular member 1. For example, a pillar extends from the engaging member 92 toward the mating member 93, and an engaging hole structure is formed on the mating member 93 corresponding to the pillar. The pillar and the engaging hole structure can be engaged with each other, and a transverse cross-section of the engaging hole structure is in a rectangular shape.

In summary, please refer to FIGS. 1-19. The detailed description for the operations of the carrier frame 100 of the present invention is provided as follows.

Figure 4:
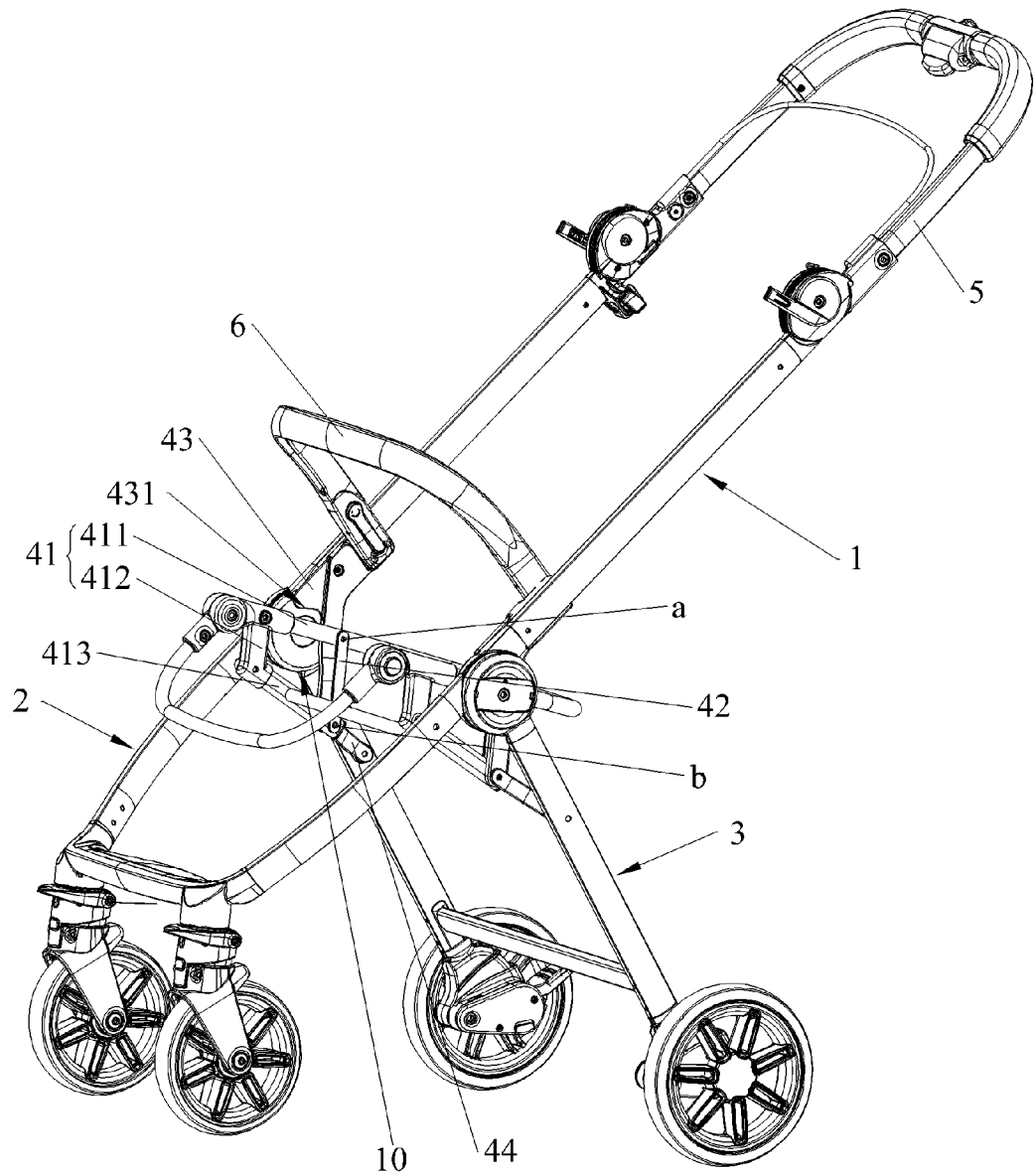
FIG. 4 is a diagram of the carrier frame of the present invention in an expanded state.
Figure 5:
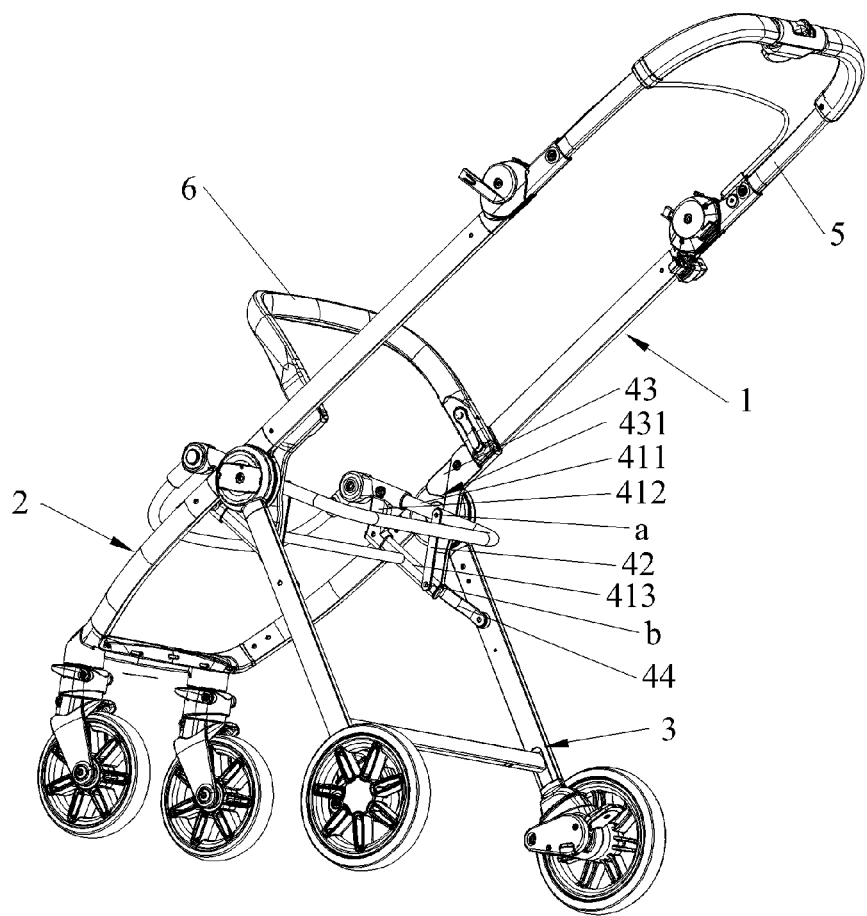
FIG. 5 is a diagram of the carrier frame of the present invention in the expanded state at another viewing angle.
Figure 6:
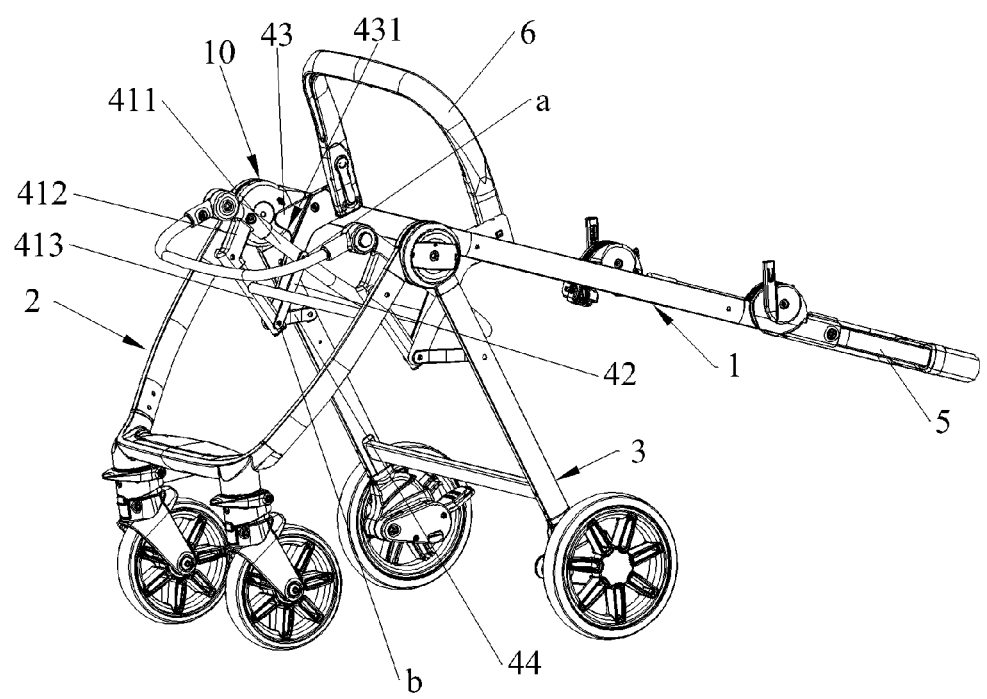
FIG. 6 is a diagram of the carrier frame of the present invention during the folding process.
Figure 7:
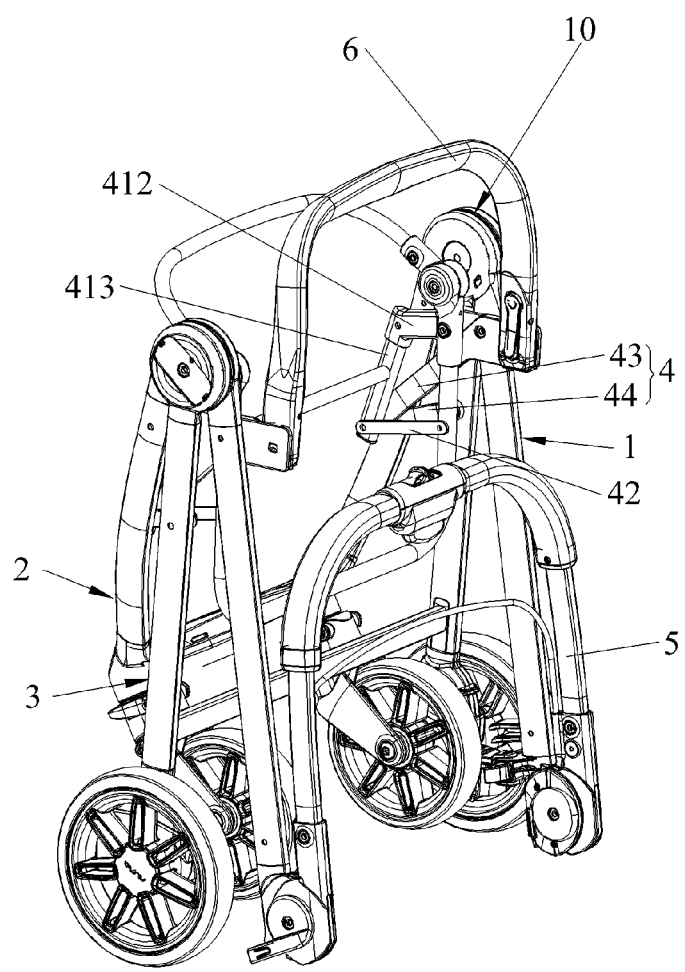
FIG. 7 is a diagram of the carrier frame of the present invention after being completely folded.

When the user wants to fold the stroller in an expanded state as shown in FIG. 4, the user can press the operating member 96 to drive the engaging member 92 via the second pulling member 91 to overcome the elastic force of the second elastic member 97. Accordingly, the engaging member 92 can be disengaged from the mating member 93 to make the second fixing member 95 freely-rotatable relative to the first fixing member 94, such that the fourth tubular member 5 can rotate freely relative to the first tubular member 1. In such a manner, the fourth tubular member 5 can be folded relative to the first tubular member 1 to form an anti-tip support foot structure as shown in FIG. 7. During the folding of the fourth tubular member 5 relative to the first tubular member 1, the driving member 77 rotates accordingly to drive the engaging hook 811 to be engaged with the fixing pillar 11, so as to lock the first tubular member 1 and the fourth tubular member 5 in a folded state. At the same time, a rotation of the driving member 77 can drive the first pulling member 71 to pull the pushing member 72, such that the pushing member 72 can push the locking member 75 to move along the pivot shaft between the first mounting base 73 and the second mounting base 74. When the engaging tooth structure 751 is pushed by the pushing member 72 to overcome the elastic force to be disengaged from the first tooth structure 732 and then completely engaged with the second tooth structure 741, the engaging tooth structure 751 no longer constrains a position of the first tooth structure 732 relative to the second tooth structure 741 to make the first mounting base 73 rotatable relative to the second mounting base 74, so as to achieve free rotation of the first tubular member 1 relative to the third tubular member 3. The folding of the first tubular member 1 relative to the third tubular member 3 can drive the second rod 44 to be folded relative to the pivot frame 41 via the linkage rod 43, so as to fold the third tubular member 3 relative to the second tubular member 2. In such a manner, the purpose that the folding of the first tubular member 1 relative to the third tubular member 3 can synchronously drive the third tubular member 3 to be folded relative to the second tubular member 2 is achieved.

In summary, the carrier frame 100 of the present invention has the folding unit 4 disposed thereon. The folding unit 4 includes the pivot frame 41, the first rod 42, the linkage rod 43 and the second rod 44. The pivot frame 41 is pivoted to the pivot portion 10 and the second tubular member 2. The end of the first rod 42 is pivoted to the pivot frame 41 at the first pivot point a, and another end of the first rod 42 is pivoted to the pivot frame 41 at the second pivot point b, so that the pivot frame 41 and the first rod 42 can cooperatively form the quadrilateral structure. The end of the linkage rod 43 is pivoted to the first tubular member 1, and another end of the linkage rod 43 is pivoted to the pivot frame 41 at the third pivot point. The end of the second rod 44 is pivoted to the third tubular member 3, and another end of the second rod 44 is pivoted to the linkage rod 43 at the fourth pivot point. The second pivot point b, the third pivot point and the fourth pivot point are located at the same pivot axis, so as to make the pivot frame 41, the first rod 42 and the second rod 44 cooperatively form the linkage structure. Via the design in which the linkage rod 43 drives the second rod 44 to be folded relative to the pivot frame 41 by the folding of the first tubular member 1 relative to the third tubular member 3, the third tubular member 3 can be folded relative to the second tubular member 2 simultaneously, so as to achieve the purpose that the folding of the first folding tubular member 1 relative to the third tubular member 3 can drive the third tubular member 3 to be folded relative to the second tubular member 2. In such a manner, the carrier frame 100 of the present invention can be released and folded synchronously and have advantages that the carrier frame 100 is easy to fold, has a simple structure, and is convenient to operate.

Those skilled in the art will readily observe that numerous modifications and alterations of the device and method may be made while retaining the teachings of the invention. Accordingly, the above disclosure should be construed as limited only by the metes and bounds of the appended claims.

The invention claimed is:

1. A carrier frame (100) comprising:
a first tubular member (1);
a second tubular member (2) pivoted to the first tubular member (1);
a third tubular member (3) pivoted to the second tubular member (2) to form a pivot portion (10) cooperatively with the first tubular member (1) and the second tubular member (2); and characterized by:
a folding unit (4) comprising:
a pivot frame (41) hinged to the pivot portion (10) and the second tubular member (2) respectively;
a first rod (42), an end of the first rod (42) being pivoted to the pivot frame (41) at a first pivot point, another end of the first rod (42) being pivoted to the pivot frame (41) at a second pivot point;
a linkage rod (43), an end of the linkage rod (43) being pivoted to the first tubular member (1), another end of the linkage rod (43) being pivoted to the pivot frame (41) at a third pivot point; and
a second rod (44), an end of the second rod (44) being pivoted to the third tubular member (3), another end of the second rod (44) being pivoted to the linkage rod (43) at a fourth pivot point, the second pivot point, the third pivot point and the fourth pivot point being located at the same pivot axis;
wherein a folding of the first tubular member (1) relative to the third tubular member (3) drives the second rod (2) via the linkage rod (43) to be folded relative to the pivot frame (41), so as to fold the third tubular member (3) relative to the second tubular member (2).

2. The carrier frame (100) of claim 1, characterized in that the pivot frame (41) comprises a third rod (411) connected to a fourth rod (412), the fourth rod (412) connected to a fifth rod (413), the first the first rod (42) is pivoted to the third rod (411) at the first pivot point, the first rod (42) is pivoted to the fifth rod (413) at the second pivot point, and the third rod (411) is pivoted to the pivot portion (10).

3. The carrier frame (100) of claim 2, characterized in that the second tubular member (2) is pivoted to a joint where the fourth rod (412) is connected to the fifth rod (413).

4. The carrier frame (100) of claim 1, characterized in that the pivot frame (41) and the first rod (42) cooperatively form a trapezoid structure.

5. The carrier frame (100) of claim 1, characterized in that the linkage rod (43) has a recess (431) for accommodating a location whereby the pivot frame (41) is hinged to the pivot portion (10).

6. The carrier frame (100) of claim 1, characterized in that the carrier frame (100) further comprises a guiderail (6), the guiderail (6) is connected to the linkage rod (43), and the guiderail (6) forms an upward handle structure when the first tubular member (1), the second tubular member (2) and the third tubular member (3) are folded relative to each other.

7. The carrier frame (100) of claim 1, characterized in that the carrier frame (100) further comprises a first locking device (7) for locking a rotation of the first tubular member (1) relative to the third tubular member (3), and the first locking device (7) is disposed on the pivot portion (10).

8. The carrier frame (100) of claim 7, characterized in that the carrier frame (100) further comprises a fourth tubular member (5) pivoted to the first tubular member (1), and a folding of the fourth tubular member (5) relative to the first tubular member (1) releases the first locking device (7).

9. The carrier frame (100) of claim 8, characterized in that the first locking device (7) comprises a first pulling member (71), a pushing member (72), a first mounting base (73), a second mounting base (74) and a locking member (75), the first tubular member (1) is connected to the first mounting base (73), the third tubular member (3) is connected to the second mounting base (74), the first mounting base (73) is pivoted to the second mounting base (74), the locking member (75) is movably disposed between the first mounting base (73) and the second mounting base (74), the pushing member (72) is located between the first mounting base (73) and the locking member (75), the pushing member (72) and the locking member (75) abut against each other, an end of the first pulling member (71) is connected to the pushing member (72), and when the first pulling member (71) pulls the pushing member (72), the pushing member

(72) pushes the locking member (75) to release the first mounting base (73) from the second mounting base (74).

10. The carrier frame (100) of claim 9, characterized in that a protrusion (731) extends from the first mounting base (73) toward the pushing member (72), a ramped surface (721) is formed on the pushing member (72) corresponding to the protrusion (731), the end of the first pulling member (71) is wound on the pushing member (72), the first pulling member (71) pulls the pushing member (72) to rotate for making the protrusion (731) abut against the ramped surface (721), and the protrusion (731) abuts against the ramped surface structure (721) to make the pushing member (72) push the locking member (75) to move.

11. The carrier frame (100) of claim 10, characterized in that the ramped surface (721) is a spiral surface structure formed on the pushing member (72).

12. The carrier frame (100) of claim 10, characterized in that a first winding slot (722) is formed on the pushing member (72), and the first pulling member (71) is wound on the first winding slot (722).

13. The carrier frame (100) of claim 9, characterized in that the first locking device (7) further comprises a first elastic member (76) disposed between the second mounting base (74) and the locking member (75).

14. The carrier frame (100) of claim 13, characterized in that the locking member (75) has an engaging tooth structure (751), a first tooth structure (732) is formed on the first mounting base (73), a second tooth structure (741) is formed on the second mounting base (74), the first elastic member (76) pushes the engaging tooth structure (751) thereby for the engaging tooth structure (751) to be engaged with the first tooth structure (732) and the second tooth structure (741) to lock the first mounting base (73) and the second mounting base (74).

15. The carrier frame (100) of claim 14, characterized in that the pushing member (72) pushes the engaging tooth structure (751) to overcome an elastic force of the first elastic member (76) thereby for the engaging tooth structure (751) to be disengaged from the first tooth structure (732), to release the first mounting base (73) from the second mounting base (74).

16. The carrier frame (100) of claim 9, characterized in that the locking member (75) is movable along a pivot shaft between the first mounting base (73) and the second mounting base (74).

17. The carrier frame (100) of claim 9, characterized in that the pushing member (72) is movable along a pivot shaft between the first mounting base (73) and the second mounting base (74).

18. The carrier frame (100) of claim 9, characterized in that the first locking device (7) further comprises a driving member (77) disposed through the first tubular member (1) and the fourth tubular member (5) and engaged with the fourth tubular member (5), another end of the first pulling member (71) is wound on the driving member (77), and the folding of the fourth tubular member (5) relative to the first tubular member (1) allows the driving member (77) to rotate and pull the first pulling member (71).

19. The carrier frame (100) of claim 18, characterized in that a second winding slot (771) is formed on the driving member (77), and the first pulling member (71) is wound on the second winding slot (771).

20. The carrier frame (100) of claim 18, characterized in that the carrier frame (100) further comprises a locking structure (8) locking the first tubular member (1) and the fourth tubular member (5) in a folded state.

21. The carrier frame (100) of claim 20, characterized in that the locking structure (8) comprises a torsional spring (81), an end of the torsional spring (81) is mounted on the driving member (77), another end of the torsional spring (81) has an engaging hook (811), a fixing pillar (11) extends outward from the first tubular member (1), and when the fourth tubular member (5) is folded on the first tubular member (1), the driving member (77) drives the engaging hook (811) for the engaging hook (811) to be engaged with the fixing pillar (11).

22. The carrier frame (100) of claim 21, characterized in that an insertion slot (772) corresponding to the torsional spring (81) is formed on the driving member (77).

23. The carrier frame (100) of claim 8, characterized in that the carrier frame (100) further comprises a second locking device (9) disposed between the first tubular member (1) and the fourth tubular member (5) for locking a rotation of the fourth tubular member (5) relative to the first tubular member (1).

24. The carrier frame (100) of claim 23, characterized in that the second locking device (9) comprises a second pulling member (91), an engaging member (92), a mating member (93), a first fixing member (94), a second fixing member (95) and an operating member (96), the first tubular member (1) is connected to the first fixing member (94), the fourth tubular member (5) is connected to the second fixing member (96), the first fixing member (94) is connected to the second fixing member (95), the mating member (93) is connected to the first fixing member (94), the engaging member (92) is slidably disposed on the second fixing member (95), the engaging member (92) is engaged with the mating member (93) to lock the first tubular member (1) and the fourth tubular member (5) in an expanded state, an end of the second pulling member (91) is connected to the operating member (96), another end of the second pulling member (91) is connected to the engaging member (92), and the operating member (96) is operated to disengage the engaging member (92) from the mating member (93) via the second pulling member (91).

25. The carrier frame (100) of claim 24, characterized in that the first fixing member (94) and the second fixing member (95) are fitted with each other and pivoted to each other.

26. The carrier frame (100) of claim 24, characterized in that the second locking device (9) further comprises a second elastic member (97), and the second elastic member (97) provides an elastic force for the engaging member (92) to be engaged with the mating member (93).

27. The carrier frame (100) of claim 22, characterized in that a pillar extends from the engaging member (92) toward the mating member (93), and an engaging hole structure is formed on the mating member (93) corresponding to the pillar.

28. The carrier frame (100) of claim 8, characterized in that when the fourth tubular member (5) is folded on the first tubular member (1), the first tubular member (1) and the fourth tubular member (5) cooperatively form a support foot structure.

\* \* \* \* \*